(12) United States Patent
El Dokor et al.

(10) Patent No.: US 12,205,329 B1
(45) Date of Patent: Jan. 21, 2025

(54) CALIBRATION FOR MULTI-CAMERA AND MULTISENSORY SYSTEMS

(71) Applicant: Edge 3 Technologies, Inc., Phoenix, AZ (US)

(72) Inventors: Tarek El Dokor, Phoenix, AZ (US); Jordan Cluster, Tempe, AZ (US); Milind Subhash Gide, Phoenix, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 0 days.

(21) Appl. No.: 18/542,919

(22) Filed: Dec. 18, 2023

Related U.S. Application Data

(63) Continuation of application No. 18/103,437, filed on Jan. 30, 2023, now Pat. No. 11,900,636, which is a continuation of application No. 16/175,754, filed on Oct. 30, 2018, now Pat. No. 11,568,568.

(60) Provisional application No. 62/579,813, filed on Oct. 31, 2017.

(51) Int. Cl.
*G06T 7/80* (2017.01)
*G06T 7/593* (2017.01)

(52) U.S. Cl.
CPC ............... *G06T 7/85* (2017.01); *G06T 7/593* (2017.01)

(58) Field of Classification Search
CPC .................................. G06T 7/85; G06T 7/593
See application file for complete search history.

(56) References Cited

U.S. PATENT DOCUMENTS

| | | | | |
|---|---|---|---|---|
| 2006/0274302 A1* | 12/2006 | Shylanski | ............... | G06T 7/593 356/139.09 |
| 2007/0183669 A1* | 8/2007 | Owechko | ............. | G06K 9/6292 382/224 |
| 2010/0098293 A1* | 4/2010 | Chandraker | ............. | G06K 9/32 382/103 |
| 2011/0063403 A1* | 3/2011 | Zhang | ....................... | G06T 7/75 348/14.1 |

(Continued)

FOREIGN PATENT DOCUMENTS

| | | | | |
|---|---|---|---|---|
| AU | 2012323096 A1 * | 5/2014 | ............... | G06T 7/80 |
| EP | 2779091 A1 * | 9/2014 | ........... | H04N 13/296 |

(Continued)

*Primary Examiner* — Charles T Shedrick
(74) *Attorney, Agent, or Firm* — Gordon Kessler

(57) ABSTRACT

A method and apparatus for calibrating an image capture device are provided. The method includes capturing one or more of a single or Multiview image set by the image capture device, detecting one or more calibration features in each set by a processor, initializing each of the one or more calibration parameters a corresponding default value, extracting one or more relevant calibration parameters, computing an individual cost term for each of the identified relevant calibration parameters, and scaling each of the relevant cost terms. The method continues with combining all the cost terms once each of the calculated relevant cost terms have been scaled, determining if the combination of the cost terms has been minimized, adjusting the calibration parameters if it is determined that that the combination of the cost terms has not been minimized, and returning to the step of extracting one or more of the relevant calibration parameters.

6 Claims, 13 Drawing Sheets

(56) References Cited

U.S. PATENT DOCUMENTS

| | | | | |
|---|---|---|---|---|
| 2012/0194652 | A1* | 8/2012 | Myokan | G06T 7/85 |
| | | | | 348/50 |
| 2014/0300736 | A1* | 10/2014 | Reitinger | G06T 7/80 |
| | | | | 348/144 |
| 2016/0189358 | A1* | 6/2016 | Boufarguine | H04N 13/128 |
| | | | | 348/50 |
| 2018/0007345 | A1* | 1/2018 | Bougnoux | H04N 13/239 |
| 2018/0165875 | A1* | 6/2018 | Yu | G06T 7/579 |
| 2018/0249142 | A1* | 8/2018 | Hicks | G01B 11/2545 |
| 2018/0330521 | A1* | 11/2018 | Samples | A63F 13/42 |
| 2019/0208181 | A1* | 7/2019 | Rowell | H04N 9/8205 |
| 2021/0279845 | A1* | 9/2021 | Feng | G06T 7/13 |
| 2021/0327092 | A1* | 10/2021 | Jiang | H04N 13/246 |

FOREIGN PATENT DOCUMENTS

| | | | | | |
|---|---|---|---|---|---|
| WO | WO-2013182873 | A1 * | 12/2013 | | H04N 13/239 |
| WO | WO-2015185968 | A1 * | 12/2015 | | G06T 17/00 |
| WO | WO-2016113429 | A2 * | 7/2016 | | G06T 7/74 |
| WO | WO-2019050417 | A1 * | 3/2019 | | |
| WO | WO-2019202042 | A1 * | 10/2019 | | G06T 7/55 |
| WO | WO-2021150369 | A1 * | 7/2021 | | |

* cited by examiner

CALIBRATION FOR MULTI-CAMERA AND MULTISENSORY SYSTEMS

CROSS REFERENCE TO RELATED APPLICATIONS

This application is a continuation of U.S. patent application Ser. No. 18/103,437 filed Jan. 30, 2023 to El Dokor et al, and titled titled "Calibration for multi-camera and multisensory Systems", which is a continuation of U.S. patent application Ser. No. 16/175,754, filed Oct. 30, 2018 to El Dokor et al., and titled "Calibration for multi-camera and multisensory Systems", now U.S. Pat. No. 11,568,568, which in turn claims the benefit of U.S. Provisional Patent Application Ser. No. 62/579,813, filed Oct. 31, 2017 to El Dokor et al., and titled "Calibration for multi-camera and multisensory Systems", the entire contents of these applications being incorporated herein by reference.

BACKGROUND

Calibration, as an engineering challenge, has been around for a very long time. Many tools that are available in the industry are incapable of autocalibrating themselves. Such tools need to be constantly recalibrated in order for them to function well. As an example, most laser-based range finding tools that are used outdoors on robotics platforms require constant calibration. Such laser-based tools do not function very well in direct sunlight, since they are usually IR-based and require a significant amount of power to overcome the power of the sun's ambient radiance. They also can not function through a reflective surface, such as a car window. They do not perform very well on dark, light absorbing surfaces.

It would therefore be beneficial to present a method and apparatus for overcoming the drawbacks of the prior art that are not only associated with active light source sensors, but also with passive ones, such as stereo and multiview camera systems.

SUMMARY

The inventors of the present invention have further recognized that another example of tools lacking autocalibration is presented when employing stereo rigs, i.e. two or more cameras placed at known locations, at least relative to each other, with the expectation that a measurement or distance analysis is to be performed using such a rig. The problem is that stereo calibration has not been perfected. Calibration algorithms for stereo rigs aim at capturing the intrinsic and extrinsic parameters that are associated with a given stereo rig. Intrinsic parameters are parameters that are associated with the individual cameras themselves (focal length, pixel pitch, camera resolution, etc.) The extrinsic parameters are ones that define the distance and orientation relationships (degrees of freedom) between the various camera nodes in a stereo rig. These parameters include rotation parameters, like pitch, yaw, and roll. They also include translation parameters, like distance in x, y and z, of the nodes relative to each other.

Calibration aims at estimating such parameters based on a series of observations. Most calibration approaches, such as those known in in the art, require known three-dimensional information from the scene. Such approaches often require a specialized calibration pattern or target.

The inventors of the present invention have further noted that if such information is absent from the scene, calibration is usually performed up to an unknown scale.

There is a significant amount of work in Industry and Academia pointing in the direction of solid autocalibration reconstruction. The problem, in many of these cases is that the authors themselves claim very high accuracy, but their work comes to within a few fractions of a degree to the ground truth. Such results are good, but not adequate for a highly accurate measuring device, where an error in under a degree could mean the difference in various inches of measurement for an object during a dimensioning (an object measurement) process.

Therefore, in accordance with one or more embodiments of the invention, a series of new techniques for in-line and offline calibration are presented to address the many shortcomings of current approaches. Multiple variants of calibration targets are proposed as well as techniques to take advantage of constancy relationships for objects in the field, and, in doing so, reduce the computational complexity as well as improve the accuracy rate. Most existing techniques suffer from not converging accurately enough on ground truth results. We address this problem as well as some of the other shortcomings associated with stereo and multi-view configurations. These new approaches are not only scalable to multiple configurations of cameras but also across cameras with different focal lengths. They also allow for mass production of calibrated, highly accurate camera systems that function very well in the operating environment. The invention also extends the inventive approach to address calibration of configurations comprised of cameras in conjunction with LIDAR and radar.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

DETAILED DESCRIPTION

Auto Calibration within the Context of an Observed Constancy

We revisit the problem of auto calibration with an advantage: if a given distance, defined as a dimension, is constant, then it can be used to improve calibration. Incorporating such information into a new cost function becomes very critical to address the issue of better and more accurate calibration. In order to define such a cost function, a series of observations have to first be made:

Given two points in three-dimensional space, the distance between these two points will remain constant across multiple views taken by a camera rig. If one looks at a population of data from a calibrated stereo rig, then that population will be "well behaved" in so far as adhering to the overall disparity graph of the stereo rig. This means that the relationship between disparity and depth should follow and adhere to the overall theoretical curve. Given a hypothesis of a theoretical curve, if the data associated with real world observations does not match that curve, then the curve is fundamentally incorrect. Outliers between the theoretical curve and the data represent a good measurement of how far off the observed data is from the curve. A cost function can be defined that encapsulates information about outliers relative to the theoretical curve.

Calibration Targets

The first step in any calibration algorithm is to acquire images of the calibration target from one or more image acquisition angles. Two options are presented for a calibration target: The first consists of an object with a known size, preferably containing one or more patterns with detectable features; and the second consists of an object with unknown, albeit fixed size. Both options may produce reliable camera calibration.

Calibration with a Known Pattern Size

Figure 1:
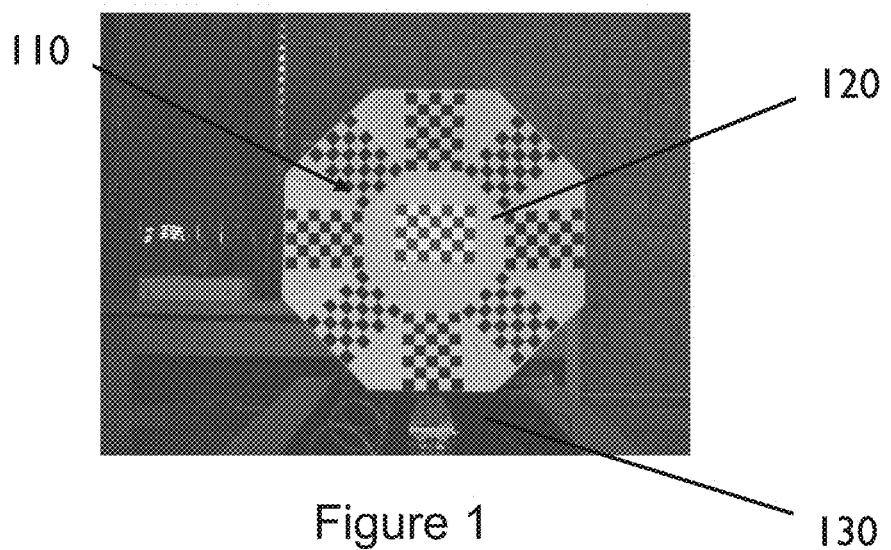
FIG. 1 is an example of a calibration target and jig constructed in accordance with an embodiment of the invention.
Figure 2:
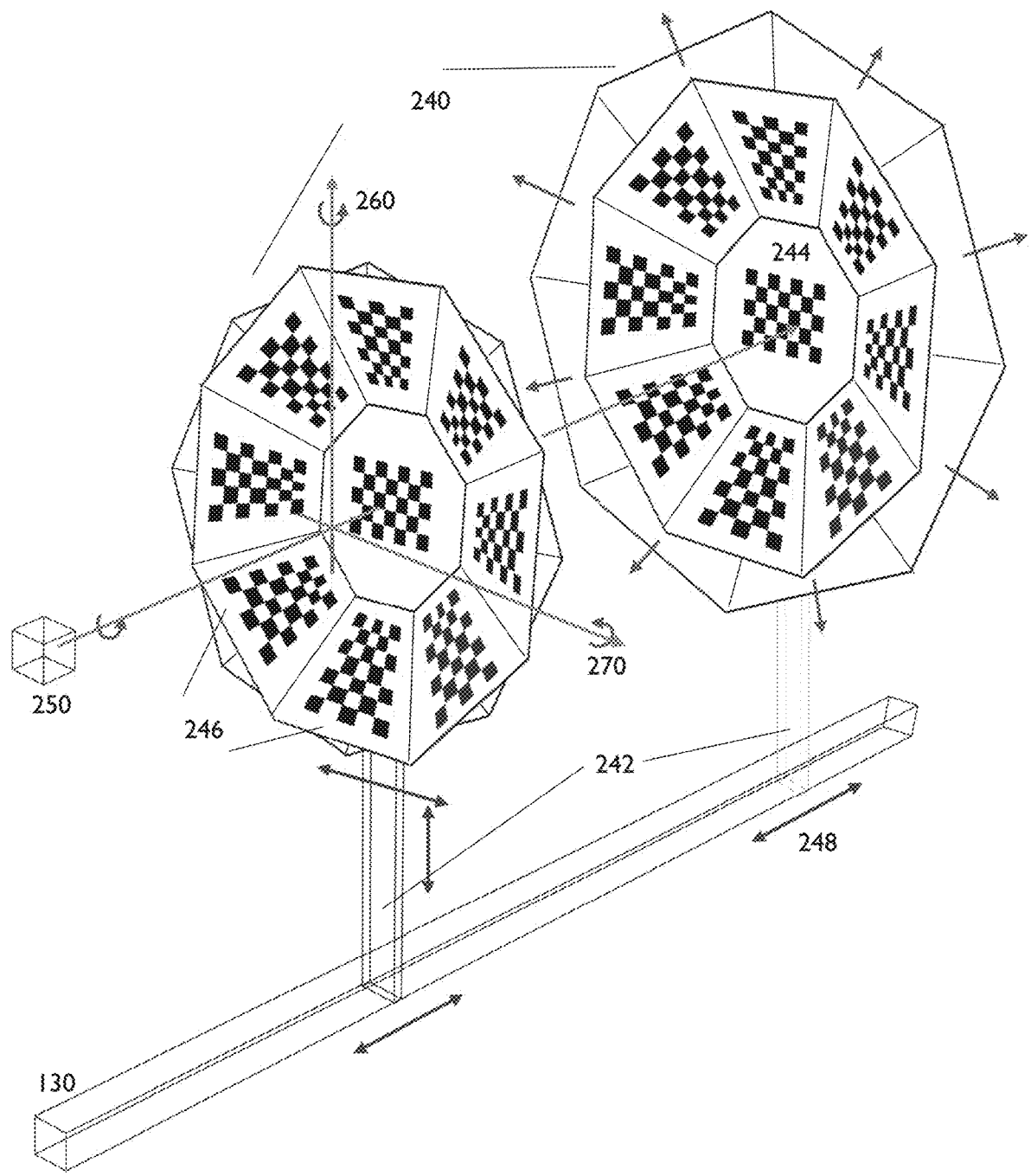
FIG. 2 is a perspective view depicting preferred motions of the calibration target and jig of FIG. 1.

An example of a calibration target 110 with a known size is shown in FIG. 1. This calibration target 110 consists of one or more patterns of detectable features 120, such as a checkerboard or pattern of circular dots. Including multiple patterns on the same target is a method of obtaining additional high accuracy calibration features from a single image. Preferably, this target is mounted to a calibration jig 130 that is able to move the calibration target to multiple fixed distances and/or orientations (pan, tilt, rotation). Referring next to FIG. 2, a calibration element 240 is shown including a support element 242 removably fixable to jig 130, a central calibration element 244, and one or more extendable calibration elements 246 for adjusting a size of calibration element 240. As is shown in FIG. 2, extendible. As is further shown in FIG. 2, calibration target 240 is preferably moveable along jig 130 in a direction 248 perpendicular to a plane of a camera to be calibrated. Additionally, calibration target 240 may be adjusted (pan, tilt, rotation) according to the movement thereof in any of the corresponding directions 250, 260, 270.

Figure 3:
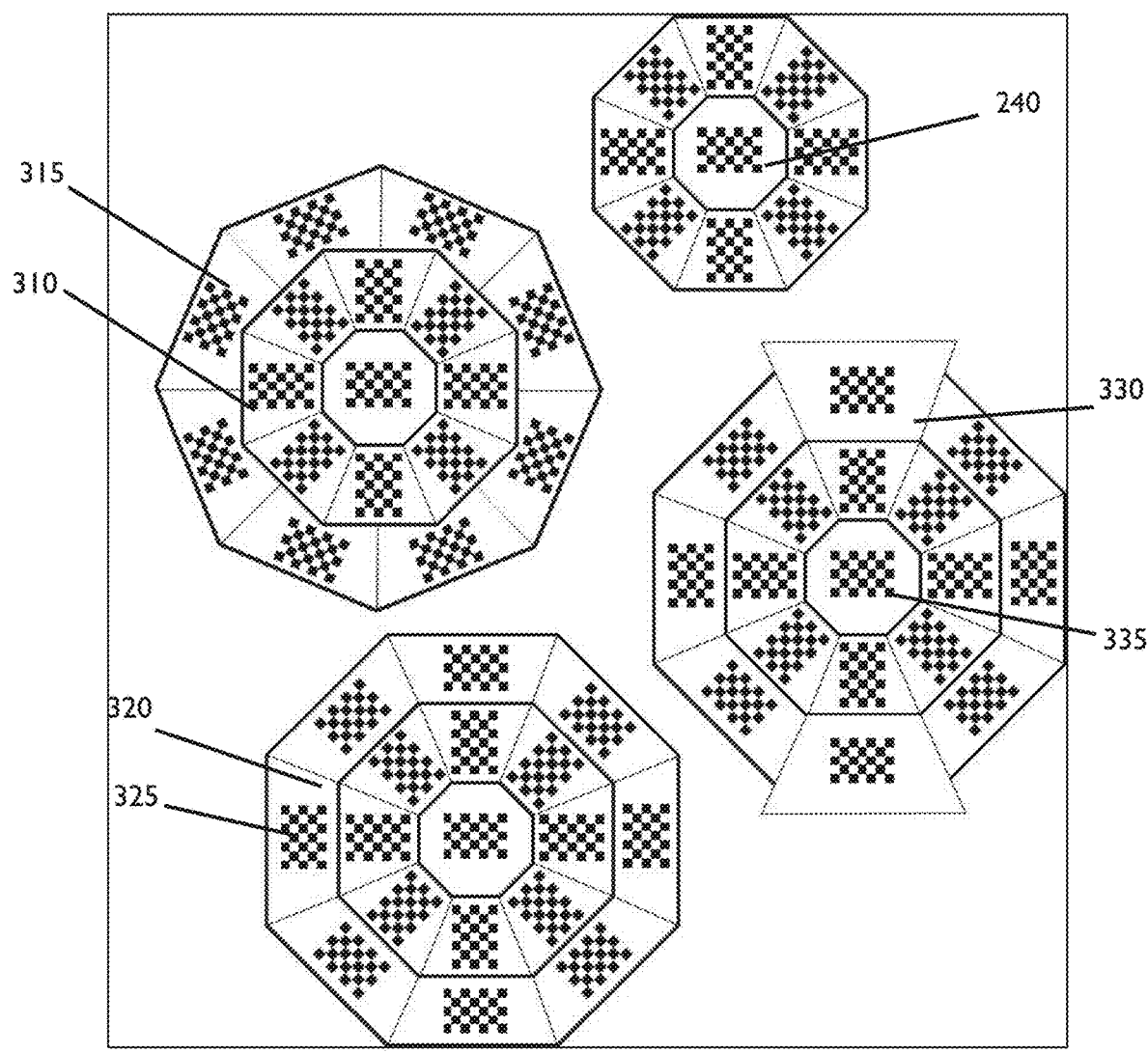
FIG. 3 is a plan view depicting alternative flower calibration elements constructed in accordance with alternative embodiments of the present invention.

Alternative flower type calibration targets are shown in FIG. 3, which include not only different shapes, but also different sizes, thus further representing calibration target 240 of FIG. 2. As is further shown in FIG. 3, initial calibration target 240 may be provided with an additional outer layer, as is shown in calibration target 310 (including offset calibration patterns 315) or calibration target 320 (including aligned calibration patterns 325). In an alternative embodiment of the invention, a non-regular pattern may also be provided in order to fill a field of view of a camera to be calibrated, as is shown with calibration element 330, and extending portion 335. Variations include multiple rings of petals, petals at different orientations, and petals that are only partially expanded.

Calibration with an Unknown Pattern Size

Figure 4:
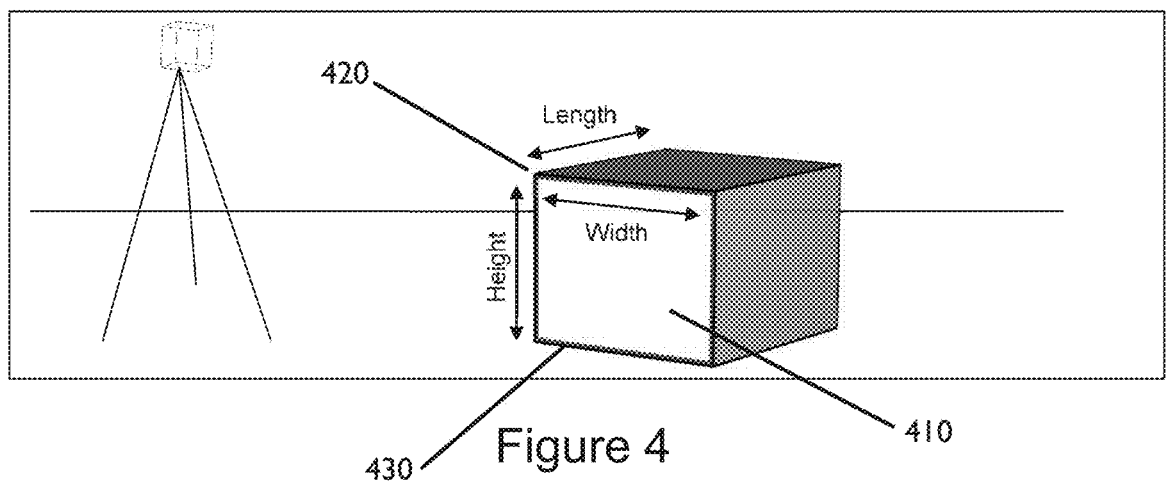
FIG. 4 is a perspective view depicting implementation of a calibration process with an object of unknown size in accordance with an alternative embodiment of the invention.

Additionally, an object of unknown size may be used as the calibration target. This target again must contain detectable features, but these features need not be a part of a repeating pattern. The only constraint is that the features remain in a fixed location on calibration target in all image captures. For example, as shown in FIG. 4, a cuboid object, such a box of unknown dimensions 410 may be used as the calibration target. In this case, the corners 420 and/or edges 430 of the box are of a fixed and detectable feature. Consistent locations of these features thus allow for calibration in accordance with any of the methods or systems described in this application. Additionally, an object of unknown size may be used as the calibration target. This target, similarly to the "box" example note above, may be utilized as long as the target includes one or more easily-distinguishable features, and as long as those distinguishable features are maintained at consistent positions.

Cost Functions

Figure 5:
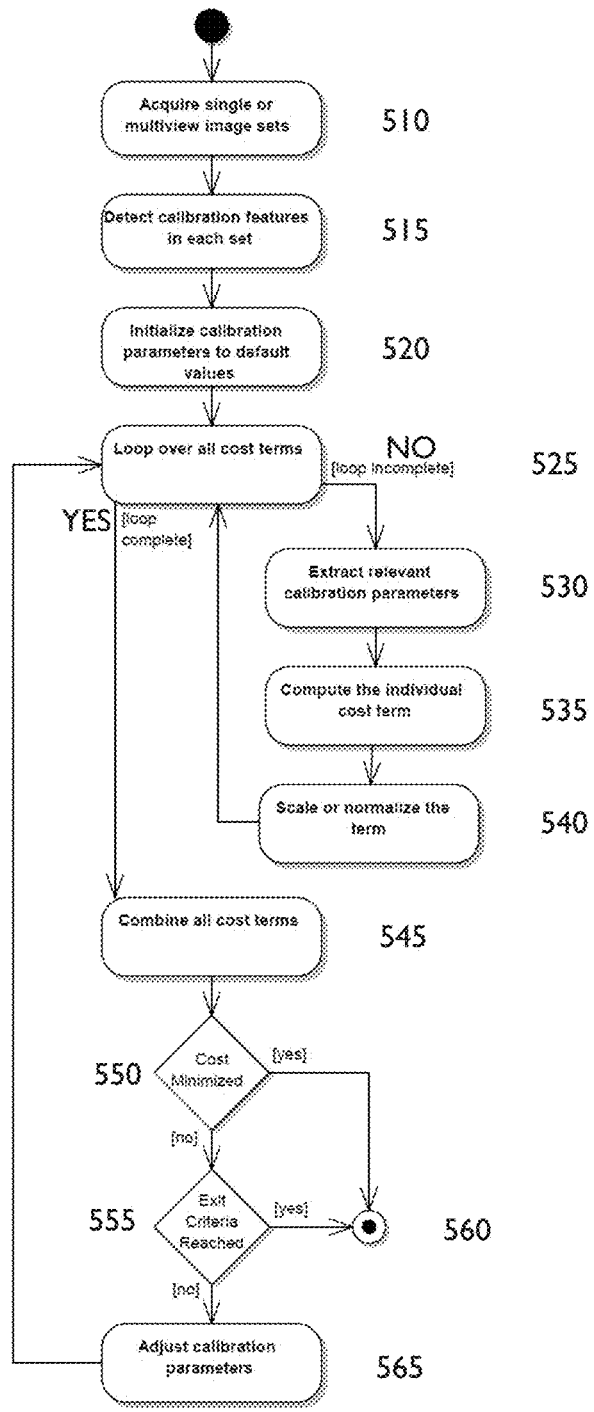
FIG. 5 is a flowchart depicting a generic calibration process for estimating camera parameters in accordance with an embodiment of the invention.

A general framework for estimating calibration parameters is depicted in FIG. 5. As previously mentioned, the first step 510 is to acquire multiple single or multi-view image sets viewing a calibration target. The features of the calibration target, such as the centroids of a circular pattern or the corners of a checkerboard or cuboidal object, are detected in each image at step 515. The calibration parameters are then initialized to default values, which may be random, derived of hardware tolerances, or estimated from features of the detected features in closed form, at step 520. Next, the cost terms for each relevant cost function are computed at step 525 using the current estimate of the camera parameters. As is further shown in FIG. 5, step 525 inquires whether all cost terms have been analyzed. If the inquiry at step 525 is answered in the negative, and it is therefore determined that all cost terms have not yet been analyzed, processing continues at step 530 where one or more relevant calibration parameters are extracted relevant to the cost terms being currently considered. Processing continues at 535 where an individual cost term is computed, and finally to step 540 where the computer cost term is scaled or normalized. At this step, each term is either normalized, weighted, or scaled to a common unit system allowing the individual terms to be averaged, aggregated, or otherwise combined to obtain a final cost term.

If, on the other hand, the inquiry at step 525 is answered in the affirmative, and it is therefore determined that all cost terms have been considered, processing instead passes to step 545 all cost terms are preferably combined. Of course, any desirable or relevant subset of all cost terms may be employed at this point. An inquiry is then initiated at step 550 as to whether the cost has been minimized. If this inquiry at step 550 is answered in the affirmative, and it is determined that cost has been minimized, then processing ends at step 560.

If, on the other hand, the inquiry at step 550 is answered in the negative, and it is determined that the cost has not been minimized, processing passes to step 555 where a second inquiry is initiated to determine whether one or more particular exit criterium has been reached. Once again, if this inquiry is answered in the affirmative, and it is determined that an exit criterium has been met, processing again ends at step 560.

If, on the other hand, the inquiry at step 555 is answered in the negative, and it is therefore determined that an exit criterium has not been reached, processing then passes to step 565 where one or more calibration parameters is adjusted. The camera parameters are adjusted using an optimization algorithm until the cost has been minimized or an exit criterion like maximum number of iterations has been reached.

After adjustment, processing then returns to step 525 for additional computation of individual cost terms.

Mathematically, the general form for online and offline calibration recovers the calibration parameters which minimize the cost, $\varepsilon$, over a set of N datasets:

$$\varepsilon^2 = \frac{1}{N}\sum_{n=1}^{N}\varepsilon_n^2 \qquad \text{Equation 1}$$

whereby, each dataset contains observations of matched features in the scene, and the cost of each dataset is determined by a weighted ($\alpha$) combination of K terms which target individual calibration parameters:

$$\varepsilon_n^2 = \frac{1}{N}\sum_{k=1}^{K}\alpha_k\varepsilon_k^2 \qquad \text{Equation 2}$$

Figure 6:
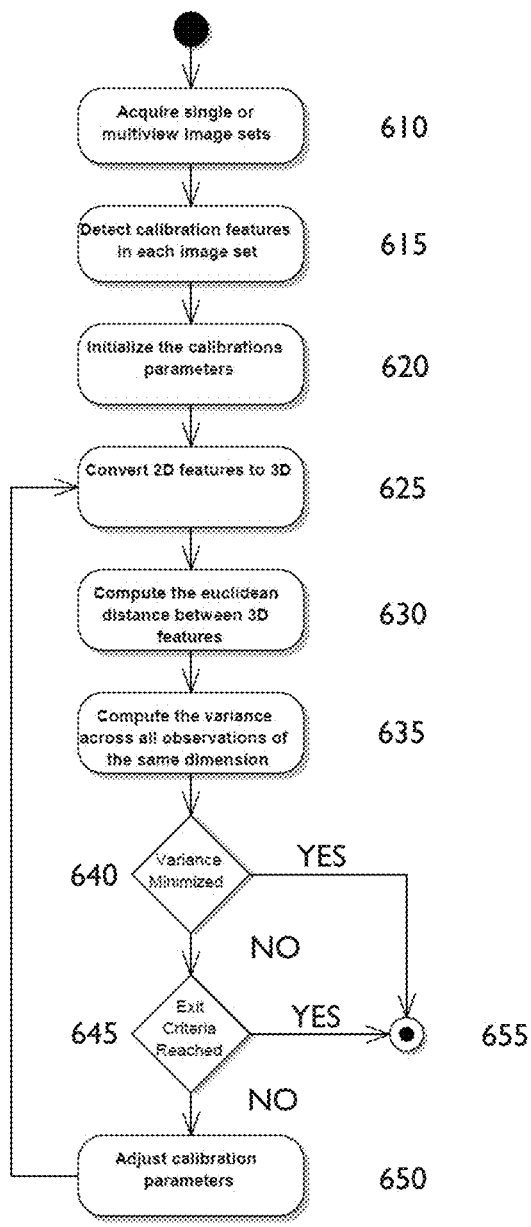
FIG. 6 is a flowchart depicting a cost function based upon dimensional consistency in accordance with an embodiment of the invention.

Dimensional Consistency—This type of cost function utilizes the fact that the dimensions of a physical or virtual object do not vary with viewpoint or distance from the camera to estimate the camera parameters. As shown in FIG. 6, the cost function computes the Euclidean distance between a set or subset of 3D calibration features, then minimizes the variation in all observations of the same measurement in the image capture set using the current camera parameters. The parameters are then are adjusted in an iterative manner using an optimization algorithm. This approach is suitable for both single and multi-view camera setups.

Referring next to FIG. 6, a process for determining a cost function based upon dimensional consistency (or constancy) is shown. The first step 610 in FIG. 6 is to acquire multiple single or multi-view image sets viewing a calibration target. The features of the calibration target, such as the centroids of a circular pattern or the corners of a checkerboard or cuboidal object, are detected in each image at step 615. The calibration parameters are then initialized to default values, which may be random, or they may be derived from camera hardware tolerances, or they may be estimated from features of the detected features in closed form, at step 620.

Processing then passes to step 625 where one or more 2D features is converted into 3D features. A Euclidian distance is then computed between the 3D features in step 630, followed by step 635, where a variance across all observations of the same dimension is computed. It is then queried at step 640 whether the variance computed at step 635 has been minimized. If this inquiry is answered in the affirmative, and it is therefore determined that the variance has been minimized, processing ends at step 655. If on the other hand it is determined at step 640 that the variance has not been minimized, then processing passes to step 645 where it is further queried whether an exit criterium has been reached. If the query at step 645 is answered in the affirmative, and it is therefore determined that an exit criterium has been reached, processing ends at step 655. If, on the other hand, it is determined at step 645 that an exit criterium has not yet been reached, processing passes to step 650 where the calibration parameters are adjusted. Calibration then returns to step 625 for further processing.

Mathematically, this approach can be described in the following lines:

Let $m_{L,i,j}=[x_{L,i,j}\ Y_{L,i,j}\ 1]^T$ and $m_{R,i,j}=[x_{R,i,j}\ Y_{R,i,j}\ 1]^T$ represent the image coordinates of matched feature j in left (L) and right (R) frames at time i. The 3D coordinates of the feature $M_{i,j}=[X_{i,j}\ Y_{i,j}\ Z_{i,j}\ 1]^T$ are computed from the singular value decomposition of:

$$m_{i,j,L}=[K_L|0]M_{i,j}=H_L M_{i,j}$$

$$m_{i,j,R}=K_R[R|t]M_{i,j}=H_R M_{i,j} \qquad \text{Equation 3}$$

where $K_R$ and $K_L$ describe the intrinsic camera parameters (focal length and principle point) and R and t describe the extrinsic parameters (rotation and translation). Given J tracked features, there exists Q dimensions between every feature pair:

$$Q = \frac{J!}{2(J-2)!} = \frac{J(J-1)(J-2)!}{2(J-2)!} = \frac{J(J-1)}{2} \qquad \text{Equation 4}$$

where the dimension between any two features (j and j+l) is given as the Euclidean distance between the 3D coordinates:

$$L_{i,j,j+l}=\|M_{i,j}-M_{i,j+l}\| \qquad \text{Equation 5}$$

When the same features are tracked over all I frames, the dimension (distance between features) should remain constant. Accordingly, this cost term recovers the extrinsic parameters which minimize the variance, $\sigma^2$, across all dimensions:

$$\varepsilon = \frac{2}{J(J-1)}\sum_{j=1}^{J}\sum_{l=1}^{J-l}\sigma_{j,j+l}^2 \qquad \text{Equation 6}$$

where the dimension variance between features j and j+l is given as a function of the mean $\mu_{j,j+l}$:

$$\sigma_{j,j+l}^2 = \frac{1}{I}\sum_{i=0}^{I}(L_{i,j,j+l}-\mu_{j,j+l})^2 \qquad \text{Equation 7}$$

-continued $$\mu_{j,j+l} = \frac{1}{I}\sum_{i=0}^{I} L_{i,j,j+l} \quad \text{Equation 8}$$

This term specifically recovers the yaw element of the rotation matrix (vergence angle), but cannot recover pitch, roll, or translation very accurately. In such a case, it is pertinent to insure tight tolerances for pitch, roll or translation during a manufacturing process.

Reprojection Error—This approach is one of the most widely used techniques in industry and academia for camera calibration and can be used for both single and multi-view image capture setups. The cost function in this case is based on the difference between the 2D locations of the detected calibration features and reprojection of the same features from 3D to 2D using the current camera parameter. 2D to 3D conversion (and vice versa) can leverage stereo triangulation and/or projection of known feature coordinates in 3D. The main drawback of reprojection error is that it is fundamentally front-heavy in the analysis. The data that is associated with a given target upfront have more pixel resolution and more associated details than the data in the back, since pixel resolution is higher in the front. This implies that the reprojection error will be schewed to the front of the data. However, most of the error comes from the same, fixed size patterns that are moved to the back of the field of view. However, the reprojection error in the back is significantly lower than the front, contributing to a lower per-pixel value. One work-around would be to normalize via individual camera pixel resolution, so that the reprojection error is no longer in pixels, but rather in real-world coordinate systems, such as inches or centimeters.

Figure 7:
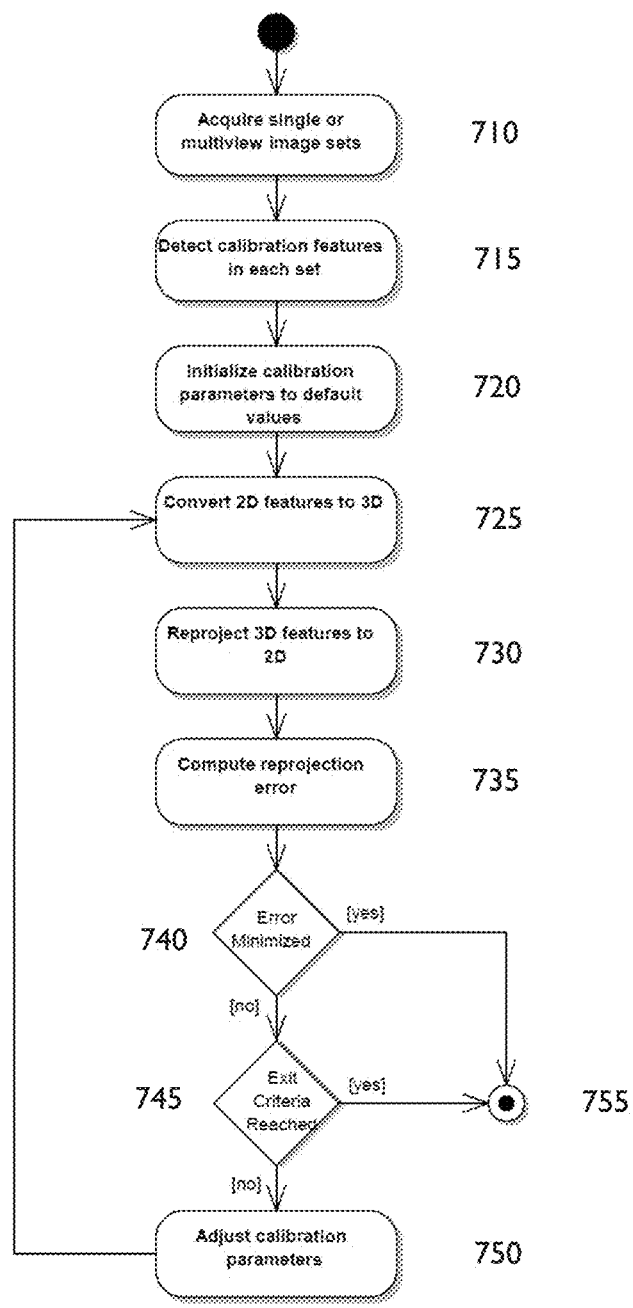
FIG. 7 is a flowchart depicting a cost function based upon reprojection error in accordance with an embodiment of the invention.

Referring next to FIG. 7, a process for determining a cost function based upon reprojection error is shown. The first step 710 in FIG. 7 is to acquire multiple single or multi-view image sets viewing a calibration target. The features of the calibration target, such as the centroids of a circular pattern or the corners of a checkerboard or cuboidal object, are detected in each image at step 715. The calibration parameters are then initialized to default values, which may be random, derived of hardware tolerances, or estimated from features of the detected features in closed form, at step 720.

Processing then passes to step 725 where one or more 2D features are converted into 3D features. 3D features are then reprojected to 2D features in step 730, followed by step 735, where a reprojection error is computed. It is then queried at step 740 whether the error computed at step 735 has been minimized. If this inquiry is answered in the affirmative, and it is therefore determined that the variance has been minimized, processing ends at step 755. If on the other hand it is determined at step 740 that the variance has not been minimized, then processing passes to step 745 where it is further queried whether an exit criterium has been reached. If the query at step 745 is answered in the affirmative, and it is therefore determined that an exit criterium has been reached, processing ends at step 755. If on the other hand it is determined at step 745 that an exit criterium has not yet been reached, processing passes to step 750 where the calibration parameters are adjusted. Processing then returns to step 725 for further processing.

Mathematically, this approach can be described as:
Given the matched 2D feature, $m_{L,i,j}$ and $m_{R,i,j}$, the triangulated 3D coordinates, $M_{i,j}$, are reprojected onto the image plane using ($p_{L,i,j}$ and $p_{R,i,j}$) which expands to:

$$p_{L,i,j} = \begin{bmatrix} x_{L,i,j} \\ y_{L,i,j} \\ 1 \end{bmatrix} = \begin{bmatrix} f_{L,x} & 0 & c_{L,x} \\ 0 & f_{L,y} & c_{L,x} \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \quad \text{Equation 9}$$

$$\begin{bmatrix} X_{i,j} \\ Y_{i,j} \\ Z_{i,j} \\ 1 \end{bmatrix} = \begin{bmatrix} f_{L,x} & 0 & c_{L,x} & 0 \\ 0 & f_{L,y} & c_{L,x} & 0 \\ 0 & 0 & 1 & 0 \end{bmatrix} \begin{bmatrix} X_{i,j} \\ Y_{i,j} \\ Z_{i,j} \\ 1 \end{bmatrix}$$

$$p_{R,i,j} = \begin{bmatrix} x_{R,i,j} \\ y_{R,i,j} \\ 1 \end{bmatrix} = \begin{bmatrix} f_{R,x} & 0 & c_{R,x} \\ 0 & f_{R,y} & c_{R,x} \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} X_{i,j} \\ Y_{i,j} \\ Z_{i,j} \\ 1 \end{bmatrix}$$

Where the f describes the focal length and c the optical center. The reprojection error cost term recovers pitch and roll by minimizing:

$$\varepsilon = \sum_{j=1}^{J}\sum_{i=1}^{I} \|p_{L,i,j} - m_{L,i,j}\|^2 + \|p_{R,i,j} - m_{R,i,j}\|^2 \quad \text{Equation 10}$$

Figure 8:
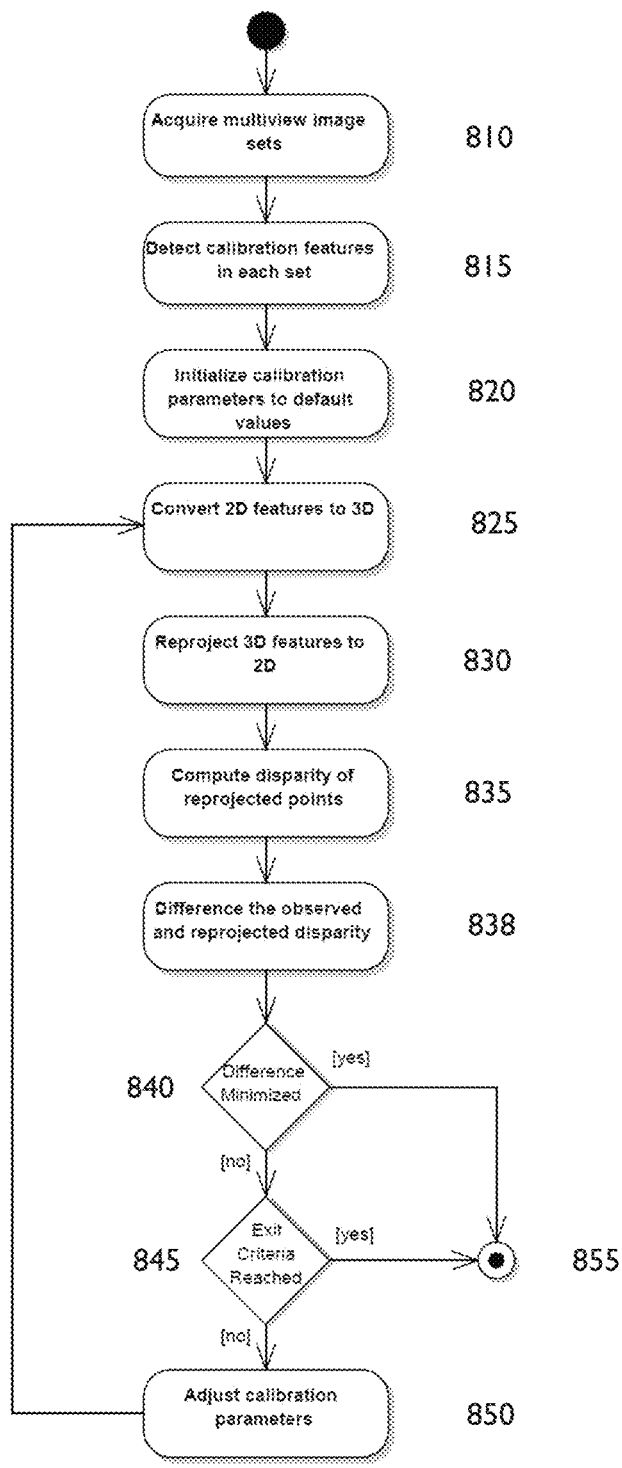
FIG. 8 is a flowchart depicting a cost function based upon disparity error in accordance with an embodiment of the invention.

Disparity Error—The disparity error approach depicted in FIG. 8 is closely related to the reprojection error based approach. Only, the differences in the reprojected and detected disparities are used instead of the differences in the reprojected and detected 2D features as the error term for the cost function. Disparity is defined as the difference in the 2D locations of a matched feature across multiple-views. As a result, this approach can be only used in a multi-view image capture setup.

Referring next to FIG. 8, a process for determining a cost function based upon disparity error is shown. The first step 810 in FIG. 8 is to acquire multiple multi-view image sets viewing a calibration target. The features of the calibration target, such as the centroids of a circular pattern or the corners of a checkerboard or cuboidal object, are detected in each image at step 815. The calibration parameters are then initialized to default values, which may be random, derived of hardware tolerances, or estimated from features of the detected features in closed form, at step 820.

Processing then passes to step 825 where one or more 2D features are converted into 3D features. 3D features are then reprojected to 2D features in step 830, followed by step 835, where a disparity of the reprojected points is computed. At step 838 a difference between the observed and reprojected disparities is determined. It is then queried at step 840 whether the difference determined at step 838 has been minimized. If this inquiry is answered in the affirmative, and it is therefore determined that the difference has been minimized, processing ends at step 855. If on the other hand it is determined at step 840 that the difference has not been minimized, then processing passes to step 845 where it is further queried whether an exit criterium has been reached. If the query at step 845 is answered in the affirmative, and it is therefore determined that an exit criterium has been reached, processing ends at step 855. If on the other hand it is determined at step 845 that an exit criterium has not yet been reached, processing passes to step 850 where the calibration parameters are adjusted. Processing then returns to step 825 for further processing.

Mathematically, this approach can be described as follows:
The disparity error is an extension of the reprojection error, which compares the observed disparity of a matched feature ($m_{L,i,j}$ and $m_{R,i,j}$):

$$d_{obs,i,j} = m_{L,i,j} - m_{R,i,j} \quad \text{Equation 11}$$

to an idealized disparity computed from the reprojection of the 3D point, $M_{i,j}$, onto the image plane ($P_{L,i,j}$ and $P_{R,i,j}$):

$$d_{ideal,i,j}=[K_L|0]M_{i,j}-K_R[R|t]M_{i,j}=p_{L,i,j}-p_{R,i,j} \quad \text{Equation 12}$$

where the cost term recovers the pitch and roll, minimizing to:

$$\varepsilon = \sum_{j=1}^{J}\sum_{i=1}^{I}(d_{obs,i,j}-d_{ideal,i,j})^2 \quad \text{Equation 13}$$

Epipolar Error—The epipolar error is another multi-view based approach that defines cost as the distance between the 2D location of a matched calibration feature and the corresponding epipolar line determined from the current parameter estimate. The iterative process then adjusts the parameters to minimize this difference. The details of the approach are described in FIG. 9.

Figure 9:
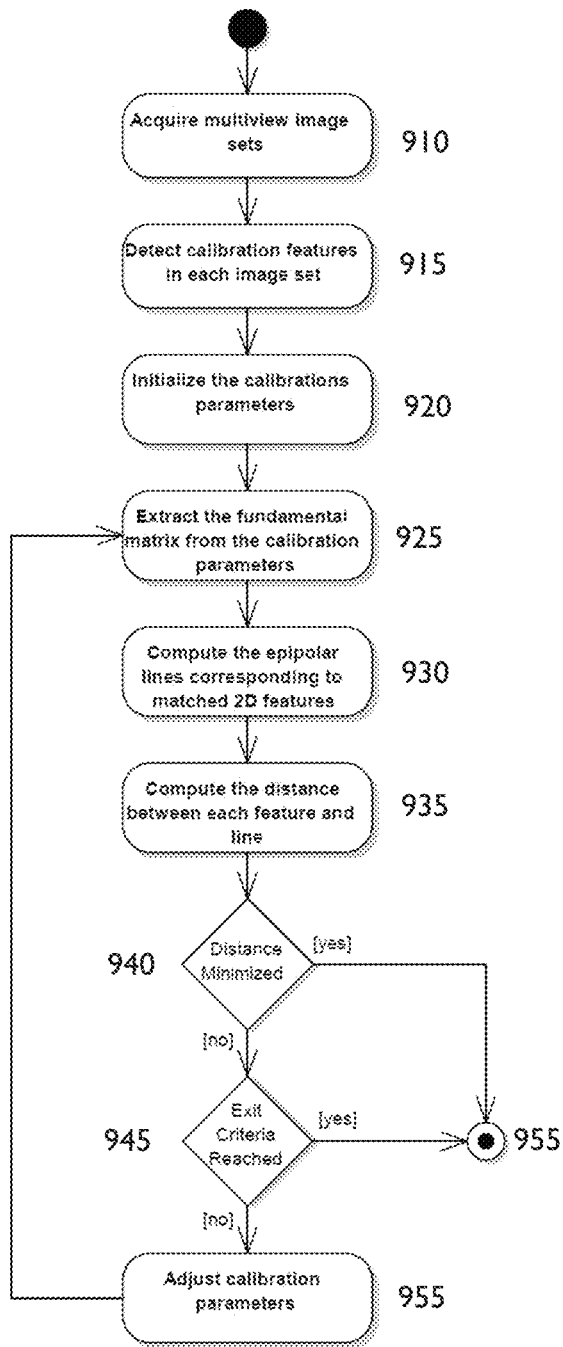
FIG. 9 is a flowchart depicting a cost function based upon epipolar error in accordance with an embodiment of the invention.

Referring next to FIG. 9, a process for determining a cost function based upon epipolar error is shown. The first step 910 in FIG. 9 is to acquire multiple multi-view image sets viewing a calibration target. The features of the calibration target, such as the centroids of a circular pattern or the corners of a checkerboard or cuboidal object, are detected in each image at step 915. The calibration parameters are then initialized to default values, which may be random, derived of hardware tolerances, or estimated from features of the detected features in closed form, at step 920.

Processing then passes to step 925 a fundamental matrix is preferably extracted from the calibration parameters. Epipolar lines corresponding to matched 2D features are then computed in step 930, followed by step 935, where a distance between each feature and line is computed. It is then queried at step 940 whether the distance computed at step 935 has been minimized. If this inquiry is answered in the affirmative, and it is therefore determined that the distance has been minimized, processing ends at step 955. If on the other hand it is determined at step 940 that the distance has not been minimized, then processing passes to step 945 where it is further queried whether an exit criterium has been reached. If the query at step 945 is answered in the affirmative, and it is therefore determined that an exit criterium has been reached, processing ends at step 955. If on the other hand it is determined at step 945 that an exit criterium has not yet been reached, processing passes to step 950 where the calibration parameters are adjusted. Processing then returns to step 925 for further processing.

Mathematically, the 2D coordinates of a matched feature in left and right images, $m_{L,i,j}=[x_{L,i,j}\ y_{L,i,j}\ 1]^T$ and $m_{R,i,j}=[x_{R,i,j}\ y_{R,i,j}\ 1]^T$, are related by the fundamental matrix, F:

$$m_{R,i,j}^T F m_{L,i,j} = 0 \quad \text{Equation 14}$$

$$[x_{R,i,j}\ y_{R,i,j}\ 1]\begin{bmatrix}F_{11} & F_{12} & F_{13}\\ F_{21} & F_{22} & F_{23}\\ F_{31} & F_{32} & F_{33}\end{bmatrix}\begin{bmatrix}x_{L,i,j}\\ y_{L,i,j}\\ 1\end{bmatrix}=0 \quad \text{Equation 15}$$

which can be expanded into the epipolar line equation at each i, j [16]:

$$(F_{11}x_{L,i,j}+F_{12}y_{L,i,j}+F_{13})x_{R,i,j}+(F_{21}x_{L,i,j}+F_{22}y_{L,i,j}+F_{23})y_{R,i,j}+(F_{31}x_{L,i,j}+F_{32}y_{L,i,j}+F_{33})=0 \quad \text{Equation 16}$$

and represented in homogeneous coordinates as $l_{R,i,j}=[a_{i,j}\ b_{i,j}\ c_{i,j}]^T$.

The distance between an observed point and the corresponding line is then given:

$$d_R(m_{R,i,j}, l_{R,i,j}) = \frac{a_{i,j}x_{R,i,j}+b_{i,j}y_{R,i,j}+c_{i,j}}{\sqrt{a_{i,j}^2+b_{i,j}^2}} \quad \text{Equation 17}$$

Where the epipolar error cost function minimizes (for all observations of all features):

$$\varepsilon = \sum_{j=1}^{J}\sum_{i=1}^{I}d_{L,i,j}^2+d_{R,i,j}^2 \quad \text{Equation 18}$$

Figure 10:
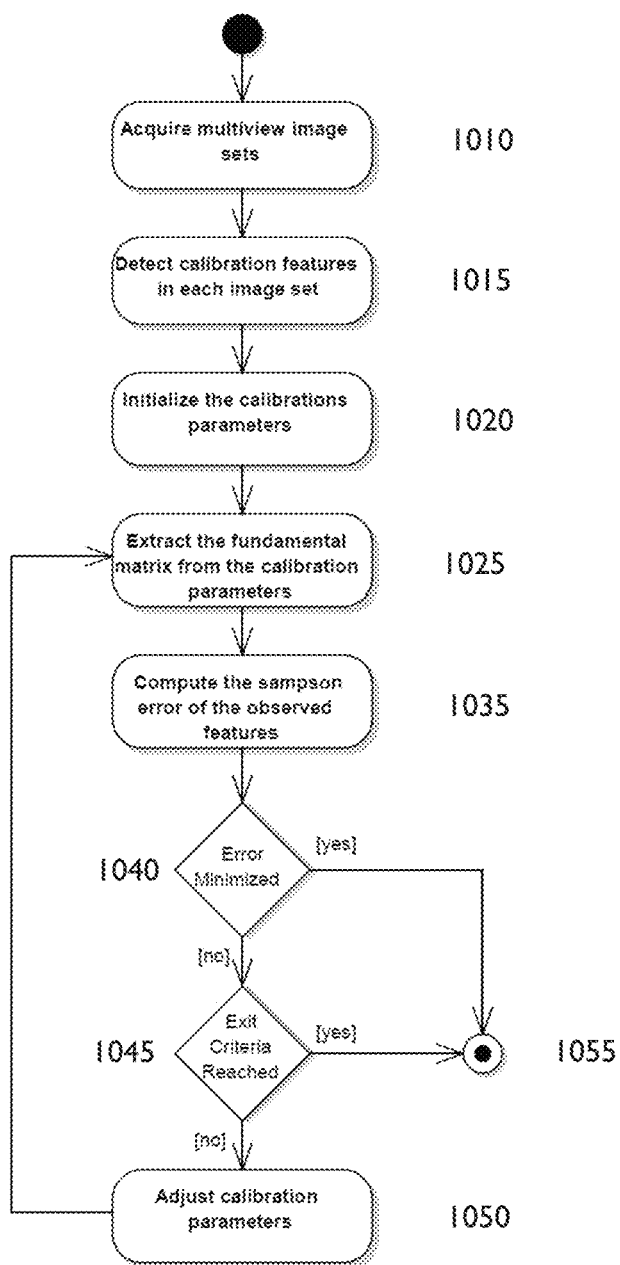
FIG. 10 is a flowchart depicting a cost function based upon Sampson distance in accordance with an embodiment of the invention.

Sampson Error—This approach uses the Sampson distance which is a first order approximation of the reprojection error (algebraic error) as the cost term. Sampson distance is based on the fundamental matrix extracted from the current calibration parameters and the 2D locations of a matched feature across multiple views. As shown in FIG. 10, the iterative procedure adjusts the calibration parameters so that the Sampson distance across all image captures and all calibration features is minimized.

Referring next to FIG. 10, a process for determining a cost function based upon Sampson distance is shown. The first step 1010 in FIG. 10 is to acquire multiple multi-view image sets viewing a calibration target. The features of the calibration target, such as the centroids of a circular pattern or the corners of a checkerboard or cuboidal object, are detected in each image at step 1015. The calibration parameters are then initialized to default values, which may be random, derived of hardware tolerances, or estimated from features of the detected features in closed form, at step 1020.

Processing then passes to step 1025 where a fundamental matrix is preferably extracted from the calibration parameters. Sampson error for the observed features is then calculated at step 1035. It is then queried at step 1040 whether the error computed at step 1035 has been minimized. If this inquiry is answered in the affirmative, and it is therefore determined that the variance has been minimized, processing ends at step 1055. If on the other hand it is determined at step 1040 that the variance has not been minimized, then processing passes to step 1045 where it is further queried whether an exit criterium has been reached. If the query at step 1045 is answered in the affirmative, and it is therefore determined that an exit criterium has been reached, processing ends at step 1055. If on the other hand it is determined at step 1045 that an exit criterium has not yet been reached, processing passes to step 1050 where the calibration parameters are adjusted. Processing then returns to step 1025 for further processing.

Mathematically, the Sampson distance is defined as:

$$s_{i,j}(m_{L,i,j}, m_{R,i,j}) = \frac{\left(m_{R,i,j}^T F m_{L,i,j}\right)^2}{(Fm_{L,i,j})(0)+(Fm_{L,i,j})(1)+\left(F^T m_{R,i,j}\right)(0)+\left(F^T m_{R,i,j}\right)(1)} \quad \text{Equation 19}$$

where $m_{L,i,j}$ and $m_{R,i,j}$ represent the observed image coordinates of a matched feature and F is the fundamental matrix. The Sampson error cost function minimizes (for all observations, i, of all features, j):

$$\varepsilon = \sum_{j=1}^{J}\sum_{i=1}^{I} s_{i,j}^2 \qquad \text{Equation 20}$$

Fundamental Error—In this approach described in, the matched 2D locations of the features are used to estimate the fundamental matrix which can then be used to compute the essential matrix. When decomposed, the essential matrix gives the rotation and translation parameters. These estimated parameters are then compared to the current parameter set and the iterative procedure adjusts the parameters until the difference between the decomposed rotation and translation parameters and the current set of parameters is minimized.

Figure 11:
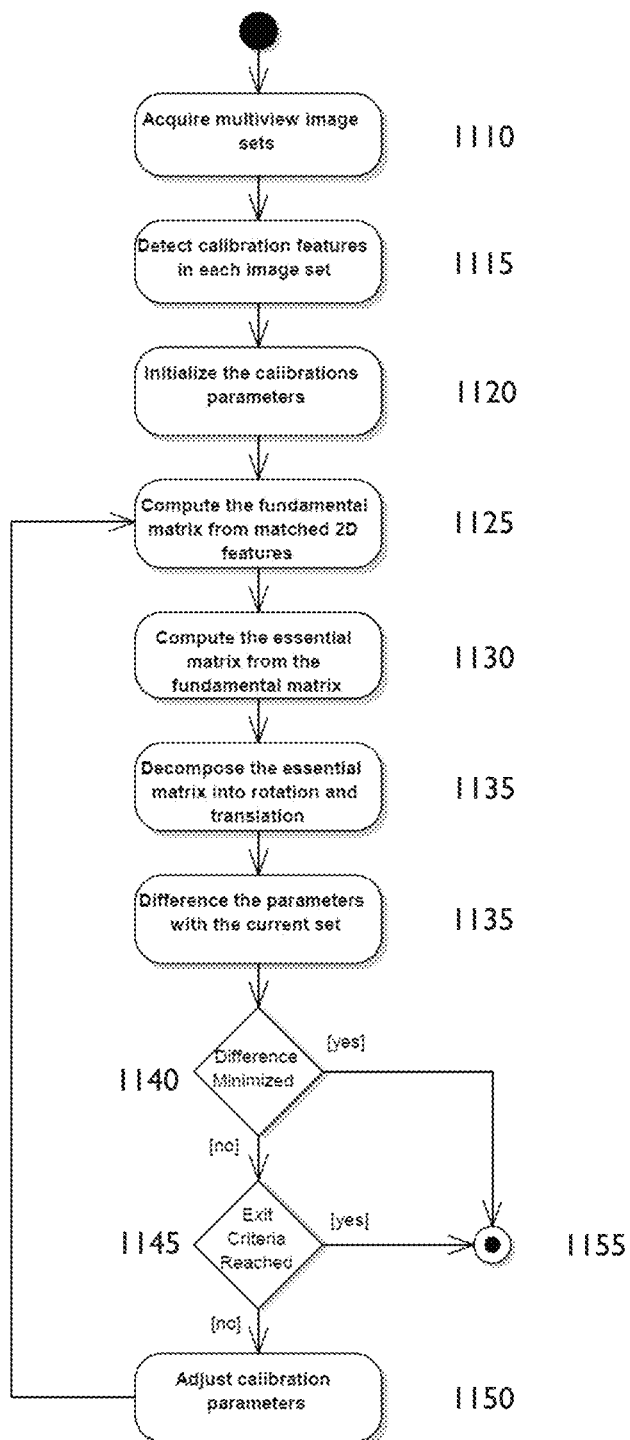
FIG. 11 is a flowchart depicting a cost function based upon fundamental matrix in accordance with an embodiment of the invention.

Referring next to FIG. 11, a process for determining a cost function based upon fundamental matrix is shown. The first step 1110 in FIG. 11 is to acquire multiple multi-view image sets viewing a calibration target. The features of the calibration target, such as the centroids of a circular pattern or the corners of a checkerboard or cuboidal object, are detected in each image at step 1115. The calibration parameters are then initialized to default values, which may be random, derived of hardware tolerances, or estimated from features of the detected features in closed form, at step 1120.

Processing then passes to step 1125 where a fundamental matrix is computed from matched 2d features. An essential matrix is then calculated from the fundamental matrix in step 1130, followed by step 1135, where the essential matrix is preferably decomposed into rotation and translation parameters. At step 1138 a difference between the newly-calculated parameters and the initial parameters is determined. It is then queried at step 1140 whether the difference determined at step 1138 has been minimized. If this inquiry is answered in the affirmative, and it is therefore determined that the difference has been minimized, processing ends at step 1155. If on the other hand it is determined at step 1140 that the difference has not been minimized, then processing passes to step 1145 where it is further queried whether an exit criterium has been reached. If the query at step 1145 is answered in the affirmative, and it is therefore determined that an exit criterium has been reached, processing ends at step 1155. If on the other hand it is determined at step 1145 that an exit criterium has not yet been reached, processing passes to step 1150 where the calibration parameters are adjusted. Processing then returns to step 1125 for further processing.

Mathematically, this approach can be described as follows:
Specifically, the fundamental matrix, F, can be recovered from eight or more point correspondences, where F is related to the essential matrix E by the intrinsic camera matrices $K_L$ and $K_R$:

$$F = K_R^{-T} E K_L^{-1} \qquad \text{Equation 21}$$

The essential matrix E is defined up to scale w by the skew-symmetric translation matrix, $[T]_x$ and the rotation matrix R:

$$E = Rw[T]_x \qquad \text{Equation 22}$$

Where the skew-symmetric matrix is defined from the stereo baseline, $t = [t_x \ t_y \ t_z]^T$, as:

$$[T]_x = \begin{bmatrix} 0 & -t_z & t_y \\ t_z & 0 & -t_x \\ -t_y & t_x & 0 \end{bmatrix} \qquad \text{Equation 23}$$

If the rotation matrix is known, then translation can be extracted from the essential matrix:

$$R^{-1}E = w[T_R]_x \qquad \text{Equation 24}$$

Allowing the cost to be defines based on the difference in the translation parameters:

$$\varepsilon = \frac{1}{3}\left(\Delta t_x^2 + \Delta t_y^2 + \Delta t_z^2\right) \qquad \text{Equation 25}$$

Combined Measurement and Reprojection Error-based Cost function for Calibration using Checkerboard Patterns—This approach described in, uses a combination of the reprojection error described in Section 4.3 and a measurement error term that is based on the differences in known physical distances between calibration features on a calibration target and 3D distances between the same features obtained as Euclidean distances between triangulated points using the current camera parameter estimate.

Figure 12:
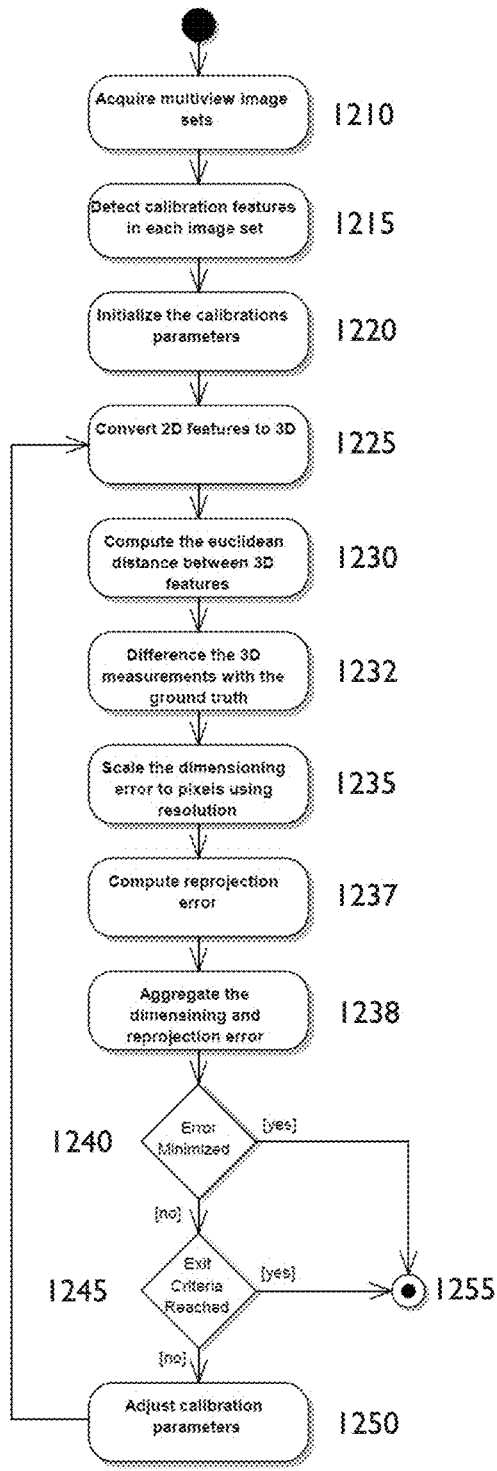
FIG. 12 is a flowchart depicting a cost function based upon dimensions and reprojection in accordance with an embodiment of the invention.

Referring next to FIG. 12, a process for determining a cost function based upon dimensions and reprojection is shown. The first step 1210 in FIG. 12 is to acquire multiple multi-view image sets viewing a calibration target. The features of the calibration target, such as the centroids of a circular pattern or the corners of a checkerboard or cuboidal object, are detected in each image at step 1215. The calibration parameters are then initialized to default values, which may be random, derived of hardware tolerances, or estimated from features of the detected features in closed form, at step 1220.

Processing then passes to step 1225 where one or more 2D features are converted into 3D features. A Euclidian distance is then computed between the 3D features in step 1230, followed by step 1232, where a difference between the 3D measurements and a ground truth is computed. At step 1235 a dimensioning error is scaled to pixels using resolution. Processing then preferably passes to step 1237 where a reprojection error is computed, and then to step 1238 where the dimensioning and reprojection errors are aggregated. It is then queried at step 1240 whether the error aggregated at step 1238 has been minimized. If this inquiry is answered in the affirmative, and it is therefore determined that the error has been minimized, processing ends at step 1255. If on the other hand it is determined at step 1240 that the error has not been minimized, then processing passes to step 1245 where it is further queried whether an exit criterium has been reached. If the query at step 1245 is answered in the affirmative, and it is therefore determined that an exit criterium has been reached, processing ends at step 1255. If on the other hand it is determined at step 1245 that an exit criterium has not yet been reached, processing passes to step 1250 where the calibration parameters are adjusted. Processing then returns to step 1225 for further processing.

Mathematically, this approach can be described as follows:
If the J features detected are detected as corners on several images taken of a checkerboard calibration pattern consisting of R row and C column corners, then the total number of features is given as:

$$J = RC \qquad \text{Equation 26}$$

Additionally, there exists U unique edges formed between every adjacent corner pair, where $$U = (R-1)C + (C-1)R = 2RC - (R+C) = 2J - (R+C) \qquad \text{Equation 27}$$

If a unique edge u in image i is defined by its reconstructed 3D endpoints $M_{i,u_1}$ and $M_{i,u_2}$, the measurement of the unique edge is given by the Euclidean distance between them, $$D_{i,u} = \|M_{i,u_1} - M_{i,u_2}\| \quad \text{Equation 28}$$

The measurement cost term is then given by the average squared error between the measurements of all unique edges and the true edge length D which are expressed in units of mm:

$$\varepsilon_{measure} = \frac{1}{UI} \sum_{i=1}^{I} \sum_{u=1}^{U} (D_{i,u} - D)^2 \quad \text{Equation 29}$$

If, $m_{L,i,j}$ and $m_{R,i,j}$ represent the $j^{th}$ matched 2D corner for the $i^{th}$ image for the left and right views, respectively, and $M_{i,j}$ represents the triangulated 3D co-ordinates that are reprojected onto the image plane as $p_{L,i,j}$ and $p_{R,i,j}$ by using Equation 9, the reprojection cost term is given as:

$$\varepsilon_{reproj} = \sum_{i=1}^{I} \sum_{j=1}^{J} \|p_{L,i,j} - m_{L,i,j}\|^2 + \|p_{R,i,j} - m_{R,i,j}\|^2 \quad \text{Equation 30}$$

The two cost terms are combined by dividing the measurement term by the pixel pitch $P_{pixel}$ (expressed as mm/pixels):

$$\varepsilon = \frac{\varepsilon_{measure}}{p_{pixel}} + \varepsilon_{reproj} \quad \text{Equation 31}$$

Figure 13:
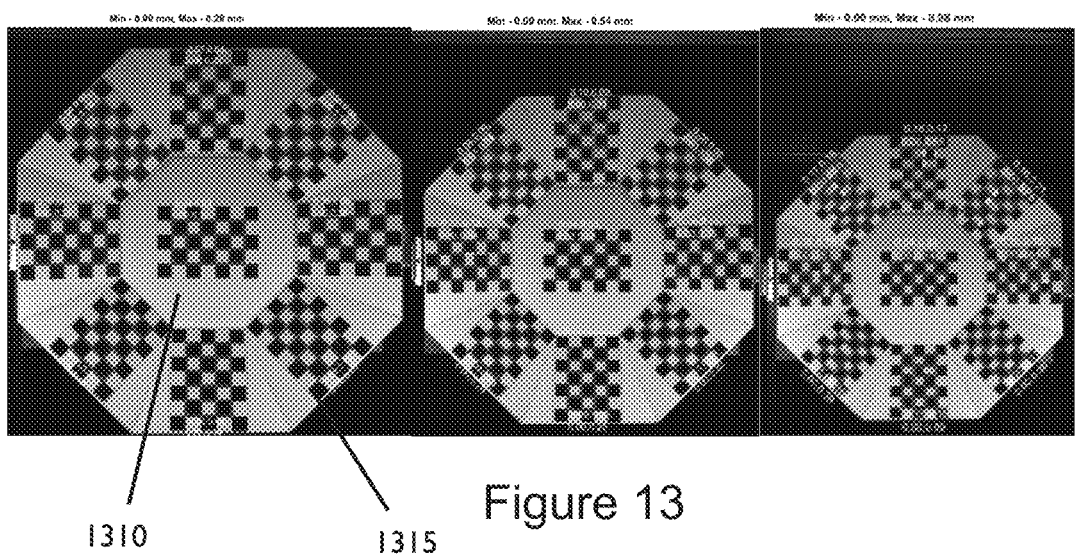
FIG. 13 is a plan view depicting measurement error during calibration with a calibration target positioned at increasing distances from a camera.

FIG. 13 shows a calibration target 1310 with 20 mm squares imprinted thereon in a radial pattern. The calibration target is shown at increasing distances from the camera. Superimposed on each image of calibration target 1310 are lines 1315 that mark the unique edges described in Equation 27 for each of the patterns of squares imprinted on calibration target 1310. The lines are pseudo-colored with the measurement error described in with blue representing low error and red representing high error.

Calibrating the Camera Response Function

The presented calibration targets can also be used in the calibration of the camera response function. The camera response function, $f$, encapsulates the nonlinear relationship between sensor irradiance, E, and the measured intensity, Z, of a photosensitive element (pixel) over an exposure time, t:

$$Z_{ij} = f(E_i t_j) \quad \text{Equation 32}$$

where i represents a spatial pixel index and j represents an image exposure index. Assuming that the function is monotonic, the camera response can be used to convert intensity to irradiance by recovering the inverse of the response, f−1 (Grossberg & Nayar, 2003):

$$f^{-1}(Z_{ij}) = E_i t_j \quad \text{Equation 33}$$

Taking the natural logarithm of both sides, the simplified notation, g, can be used to represent the log inverse function:

$$g(Z_{ij}) = \ln(f^{-1}(Z_{ij})) = \ln(E_i) + \ln(t_j) \quad \text{Equation 34}$$

Letting $Z_{min}$ and $Z_{max}$ define the minimum and maximum pixel intensities of N pixels and P images, g can be solved by minimizing the following quadratic objective function:

$$O = \sum_{i=1}^{N} \sum_{j=1}^{P} \{w(Z_{ij})[g(Z_{ij}) - \ln(E_i) - \ln(t_j)]\}^2 + \lambda \sum_{z=Z_{min}+1}^{Z_{max}-1} (w(z)g''(z))^2 \quad \text{Equation 3530}$$

Where the second term imposes a smoothness constraint on the second derivative:

$$g''(z) = g(z-1) + 2g(z) - g(z+1) \quad \text{Equation 36}$$

With respect to the scalar coefficient, $\lambda$, and the weighting function, w:

$$w(z) = \begin{cases} z - Z_{min}, & z \leq \frac{1}{2}(Z_{max} + Z_{min}) \\ Z_{max} - z, & z > \frac{1}{2}(Z_{max} + Z_{min}) \end{cases} \quad \text{Equation 31}$$

Once the inverse camera response function is known, map of the scene radiance can be obtained from P images by weighting exposures, which produce intensities closer to the middle of the response function:

$$\ln(E_i) = \frac{\sum_{j=1}^{P} w(Z_{ij})(g(Z_{ij}) - \ln(t_j))}{\sum_{j=1}^{P} w(Z_{ij})} \quad \text{Equation 38}$$

Multithreading—The iterative nature of the camera calibration process lends several opportunities for parallelization to speed up operations. As a first step, extraction of calibration features for the entire image capture set can be done in a highly parallelized manner by spawning multiple threads on specialized GPU hardware. Additionally, the cost aggregation over multiple image sets and the triangulation and reprojection operations to go from 2D to 3D coordinates and back to 2D coordinates can also be performed parallelly across multiple threads.

It will thus be seen that the objects set forth above, among those made apparent from the preceding descriptions, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for calibrating an image capture device, comprising:
   capturing one or more Multiview image sets by the image capture device;
   detecting one or more calibration features in each image set by a processor;
   initializing each of a one or more calibration parameters a corresponding default value;
   converting one or more 2D features to 3D;

computing a Euclidian distance between one or more of two or more pairs of 3D features;
computing a difference between each computed Euclidian distance and a ground truth as a dimensioning error; reprojecting one or more 3D features to 2D;
computing the reprojection error for one or more of the reprojected features;
aggregating the dimensioning errors and the reprojection errors
determining if the aggregated errors have been minimized;
adjusting the calibration parameters if it is determined that that the combination of the aggregated errors has not been minimized; and
returning to the step of converting one or more 2D features to 3D.

2. A method for calibrating an image capture device, comprising:
capturing one or more Multiview image sets by the image capture device;
detecting one or more calibration features in each image set by a processor;
initializing each of a one or more calibration parameters a corresponding default value;
extracting one or more relevant calibration parameters;
computing an individual cost term for each of the identified relevant calibration parameters comprising:
aggregation of a dimensioning error and a reprojection error
converting one or more 2D features to 3D;
computing a Euclidian distance between each of two or more pairs of 3D features;
computing a difference between each of the 3D measurements and the ground truth;
scaling a dimensioning error to one or more pixels using a resolution scaler based on pixel resolution;
computing a reprojection error;
aggregating the dimensioning error and the reprojection error
determining whether the errors have been minimized;
adjusting the calibration parameters if it is determined that that the combination of the cost terms has not been minimized; and
returning to the step of extracting one or more of the relevant calibration parameters.

3. A system for calibrating an image capture device, comprising:
a calibration target having a known size, and further including one or more known detectable features included thereon;
a calibration jig to which the calibration target, the calibration jig allowing movement of the calibration target one or more known distances relative to the image capture device; and
a processor for
capturing one or more Multiview image sets by the image capture device;
detecting one or more calibration features in each image set by a processor;
initializing each of a one or more calibration parameters a corresponding default value;
converting one or more 2D features to 3D;
computing a Euclidian distance between one or more of two or more pairs of 3D features;
computing a difference between each computed Euclidian distance and a ground truth as a dimensioning error; reprojecting one or more 3D features to 2D;
computing the reprojection error for one or more of the reprojected features;
aggregating the dimensioning errors and the reprojection errors
determining if the aggregated errors have been minimized;
adjusting the calibration parameters if it is determined that that the combination of the aggregated errors has not been minimized; and
returning to the step of converting one or more 2D features to 3D.

4. The system of claim 3, further comprising:
one or more extendible elements to adjust a size of the calibration target.

5. The system of claim 3, wherein the calibration target may be adjusted in accordance with its pan, tilt or rotation relative to the calibration jig.

6. A system for calibrating an image capture device, comprising:
a calibration target having a known size, and further including one or more known detectable features included thereon;
a calibration jig to which the calibration target, the calibration jig allowing movement of the calibration target one or more known distances relative to the image capture device; and
a processor for:
capturing one or more Multiview image sets by the image capture device;
detecting one or more calibration features in each image set by a processor;
initializing each of a one or more calibration parameters a corresponding default value;
extracting one or more relevant calibration parameters;
computing an individual cost term for each of the identified relevant calibration parameters comprising:
aggregation of a dimensioning error and a reprojection error
converting one or more 2D features to 3D;
computing a Euclidian distance between each of two or more pairs of 3D features;
computing a difference between each of the 3D measurements and the ground truth;
scaling a dimensioning error to one or more pixels using a resolution scaler based on pixel resolution;
computing a reprojection error,
aggregating the dimensioning error and the reprojection error
determining whether the errors have been minimized;
adjusting the calibration parameters if it is determined that that the combination of the cost terms has not been minimized; and
returning to the step of extracting one or more of the relevant calibration parameters.

* * * * *